July 9, 1963 R. C. DU BOIS 3,096,654
INSTRUMENT CASE FOR UNIVERSAL MOUNTING
Filed Sept. 19, 1960 5 Sheets-Sheet 1

INVENTOR.
Robert C. Du Bois
BY
Roberts Cushman & Grossi
ATT'YS

July 9, 1963  R. C. DU BOIS  3,096,654
INSTRUMENT CASE FOR UNIVERSAL MOUNTING
Filed Sept. 19, 1960  5 Sheets-Sheet 2

INVENTOR.
Robert C. Du Bois
BY
ATT'YS

July 9, 1963 R. C. DU BOIS 3,096,654
INSTRUMENT CASE FOR UNIVERSAL MOUNTING
Filed Sept. 19, 1960 5 Sheets-Sheet 3

INVENTOR.
Robert C. DuBois
BY
ATT'YS

July 9, 1963 R. C. DU BOIS 3,096,654
INSTRUMENT CASE FOR UNIVERSAL MOUNTING
Filed Sept. 19, 1960 5 Sheets-Sheet 4

INVENTOR.
Robert C. Du Bois
BY
ATT'YS

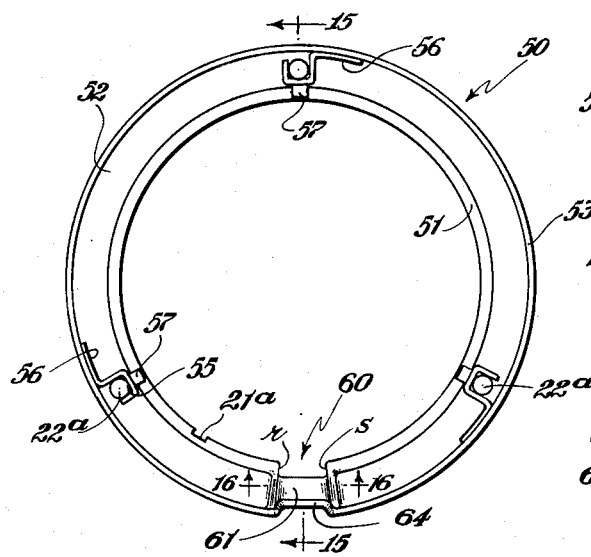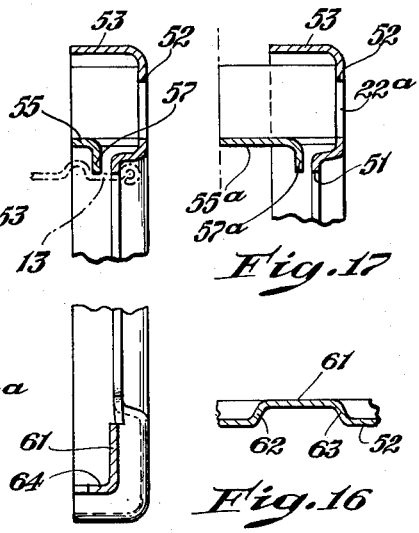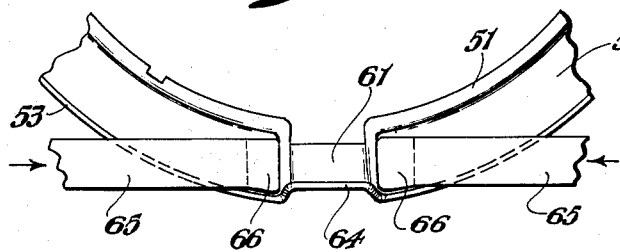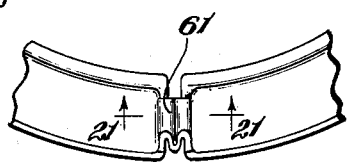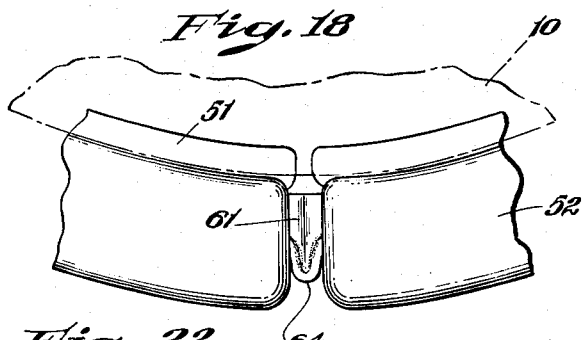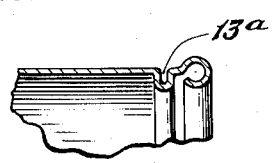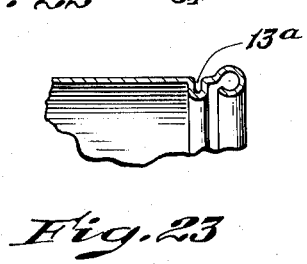

United States Patent Office 3,096,654
Patented July 9, 1963

3,096,654
INSTRUMENT CASE FOR UNIVERSAL MOUNTING
Robert C. Du Bois, Fairfield, Conn., assignor to Manning, Maxwell & Moore, Incorporated, Stratford, Conn., a corporation of New Jersey
Filed Sept. 19, 1960, Ser. No. 57,869
16 Claims. (Cl. 73—431)

This invention relates to cases for instruments such as pressure gauges, dial thermometers, clocks, electrical instruments or the like, and more particularly to a universal type of case for such instruments wherein the case is adapted for wall mounting, panel mounting or stem mounting as desired. This application is a continuation-in-part of my application Serial No. 822,961, filed June 25, 1959, now abandoned.

Instrument cases heretofore provided have customarily been designed either for mounting on a wall or for mounting in a panel assembly and have not been interchangeable for both modes of use. Where the instrument was to be stem mounted, either of the foregoing designs was employed or still a third design was used. This diversity of design increases the costs of manufacture and inventory and it is accordingly the primary object of this invention to provide a case of a single attractive design which is interchangeable and which can be employed for any of the enumerated uses. It is a further object of this invention to provide an interchangeable instrument case which is inexpensive to manufacture and which can be employed to house conventional operating mechanisms without necessitating redesign thereof. Other and further objects and advantages of the invention will be pointed out in the following more detailed description and by reference to the accompanying drawings wherein:

FIG. 14 is a rear elevation of an alternative flange member designed to be associated with the casing for mounting the latter in certain locations;

FIG. 15 is a section, to enlarged scale, on the line 15—15 of FIG. 14;

FIG. 16 is a section, to an enlarged scale, on the line 16—16 of FIG. 14;

FIG. 17 is a partial section similar to FIG. 15, but illustrating a modification;

FIG. 18 is a partial rear elevation, similar to FIG. 14, but to larger scale, illustrating means for crimping the flange of FIG. 14;

FIG. 19 is a view similar to FIG. 18, to reduced scale, illustrating the configuration of the crimped portion of the flange after it has been drawn about the casing and with the clamping means removed;

FIG. 20 is an end view of the crimped portion of the flange of FIG. 19;

FIG. 21 is a section on the line 21—21 of FIG. 19;

FIG. 22 is a front elevation, to larger scale, showing the crimped portion of the flange after it has been clamped on the casing; and FIG. 23 is a section, similar to FIG. 3, but to smaller scale, showing a modification in the configuration of the casing wall adapted for use with the flange member shown in FIG. 14.

Figure 1:
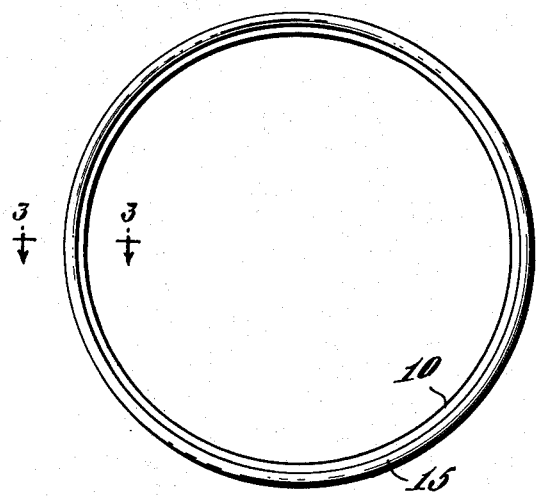
FIG. 1 is a front elevation of an improved instrument casing according to one embodiment of the present invention omitting the dial and pointer.
Figure 2:
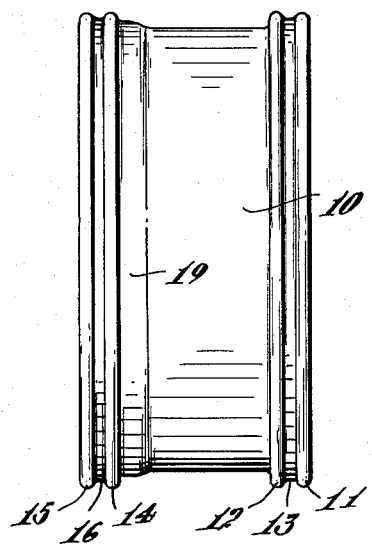
FIG. 2 is a side elevation of the casing shown in FIG. 1.
Figure 3:
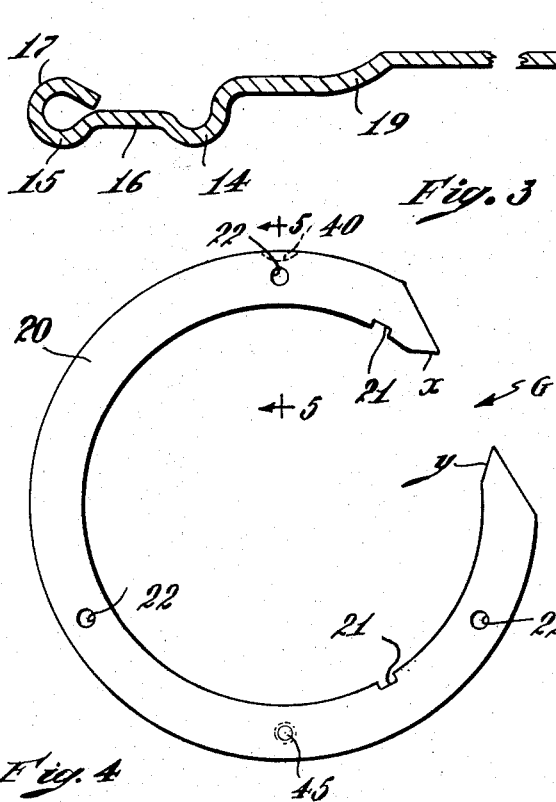
FIG. 3 is a radial section, partly broken away, substantially on the line 3—3 of FIG. 1 and to much larger scale, showing the contour of the peripheral wall of the case and the finish beads at its front and rear edges.

Referring to the drawings, FIGS. 1 to 3 illustrate the basic casing according to one embodiment of the invention, this casing, when closed at its forward end by a glass panel and at its rear end by a blow-out plate or other conventional closure, forming the case proper of the instrument. This basic casing is a tubular member 10 of sheet material having a rear pair of spaced, external, circumferential beads 11 and 12 defining therebetween a rear groove 13, and a front pair of spaced, external circumferential beads 14 and 15 defining a circumferential groove 16. The material of the casing 10 is rolled at the front and rear ends to form finished beaded edges 17 and 18 respectively.

Figure 6:
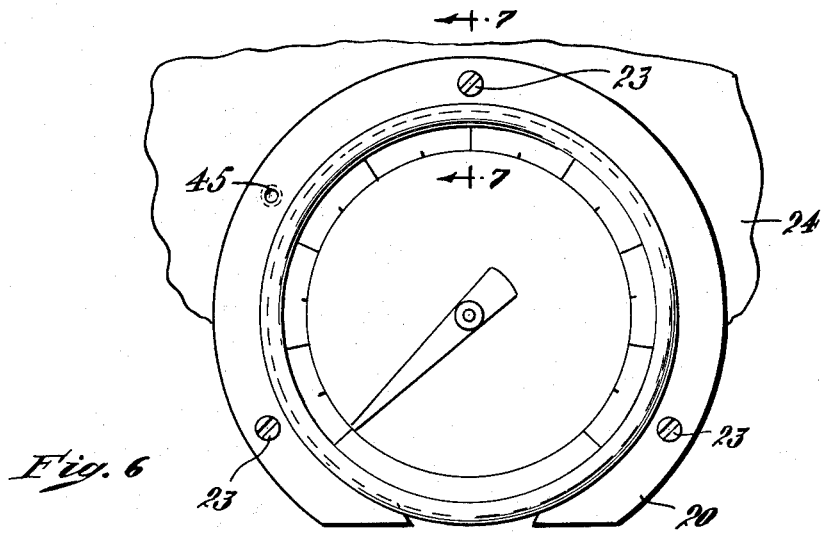
FIG. 6 is a front elevation of a gauge having the case of the present invention, with a flange like that of FIG. 4 seated in the rearward groove of the gauge casing and mounted to a wall.
Figure 8:
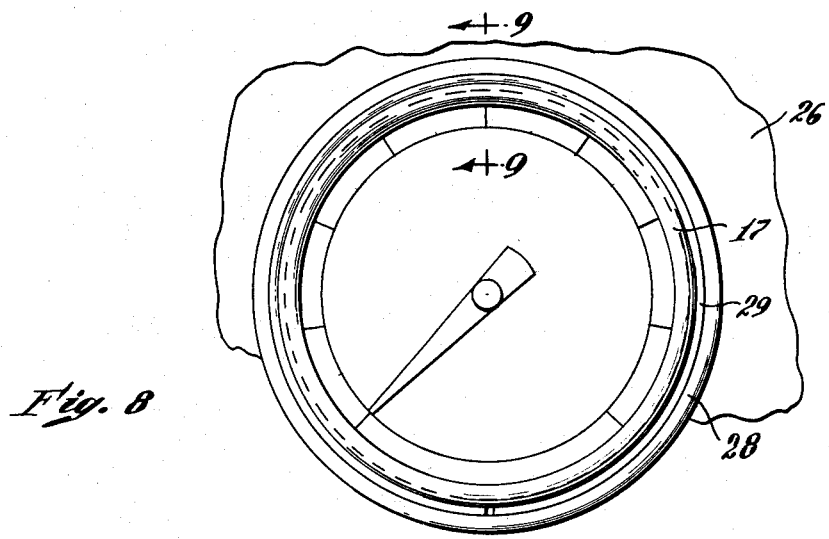
FIG. 8 is a front elevation of a gauge, having the case of the present invention, mounted in an aperture in a panel.

The casing 10 is designed and adapted to house a conventional Bourdon tube pressure-responsive mechanism (not here illustrated) comprising a rear or lower pressure connection, a Bourdon tube, a suitable gear mechanism, and an indicating needle and a dial, the latter being shown in FIGS. 6 and 8. Preferably a conventional internal pressure resistant dividing wall (not here shown) has its flanged margin welded to the dished portion 19 of the casing 10, and a rear blow-out plate (not shown) may be provided. Preferably the casing 10 is cylindrical in shape as herein shown; but it can comprise any desired, hollow tubular shape and the term "tubular" is herein used to include such additional shapes. The beaded edges 17 and 18 provide an attractive finish to the casing 10 and may serve as well to secure parts of the gauge mechanism within the casing.

Figure 4:
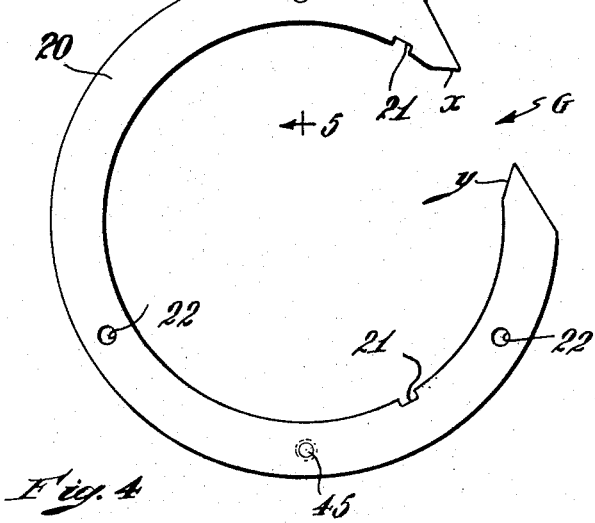
FIG. 4 is a front elevation of an arcuate flange member designed to be associated with the casing for mounting the latter in certain locations.
Figure 5:
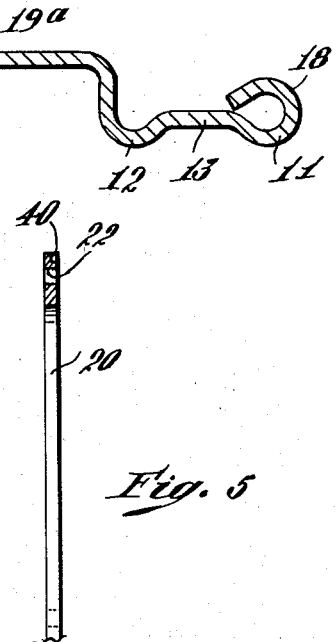
FIG. 5 is a section substantially on the line 5—5 of FIG. 4.

The casing 10 can comprise any desired sheet material, including aluminum, steel, cast iron, brass; or plastics such as heretofore have been used for this purpose, but is preferably of stainless steel for appearance and corrosion resistance in order to further the object that the instrument be universally adaptable in use. The casing 10 can be made, for example, from steel tubing or by stamping from sheet metal and thereafter rolling and welding it to the finished tubular shape.

Where it is desired to stem-mount the gauge, that is, to mount the gauge on the pipe which comprises the pressure connection, the casing 10 of FIGS. 1 and 2, without additions, together with its end closures and assembled working mechanism, may constitute the finished gauge. For such use, the cylindrical wall 19a of the casing may easily be provided with an aperture for the passage of the stem connection. The gauge case, as thus used, is attractive, light in weight and inexpensive since it does not have any protruding flange or other portions intended for wall or panel mounting.

Where it is desired to mount the gauge to a wall or to a panel, a single separate flange 20 (FIGS. 4 and 5) is provided. As indicated in FIGS. 4 and 5, this flange or annulus may be a unitary piece of sheet material, for example, like that of the casing 10, and being of annular contour, with a split gap at G, whereby it becomes possible, because of the resiliency of the material, to spread its ends x and y and so increase its internal diameter. As here illustrated, the proximate ends of the surfaces x and y are one and three-fourths inches apart.

Figure 7:
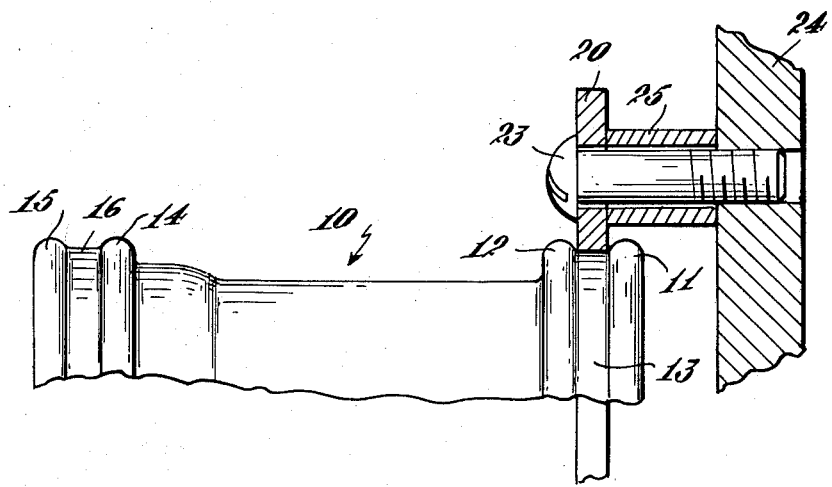
FIG. 7 is a fragmentary section to much larger scale, substantially on the line 7—7 of FIG. 6.

For wall mounting of the casing as shown in FIGS. 6 and 7, it may be assumed that the flange 20 has been expanded radially by a suitable tool and snapped into the rear casing groove 13. For this purpose the flange 20 has an internal diameter in relaxed position somewhat less than the minimum diameter of the groove 13, so that when snapped into the groove 13 of the casing it embraces the casing with considerable radial pressure. To align and prevent relative rotation between the flange 20 and the casing 10, a raised dimple (not shown) is provided in the wall of the groove 13 which engages one of the cooperating notches 21 (FIG. 4) in the inner circumference of the flange 20. The flange 20 is provided with a plurality of holes 2 (or slots) which receive screws 23 (FIG. 7) by which the flange 20 is secured to a mounting wall 24. Separate removable spacer sleeves 25 are placed over the screws 23 and between the flange 20 and the wall 24 on which the gauge is to be mounted in order to space the back of the gauge from the wall. Such spacing is desirable to provide for the escape of pressure fluid if the gauge has a rear blow-out plate adapted to release the force of any internal explosion within the gauge.

Figure 9:
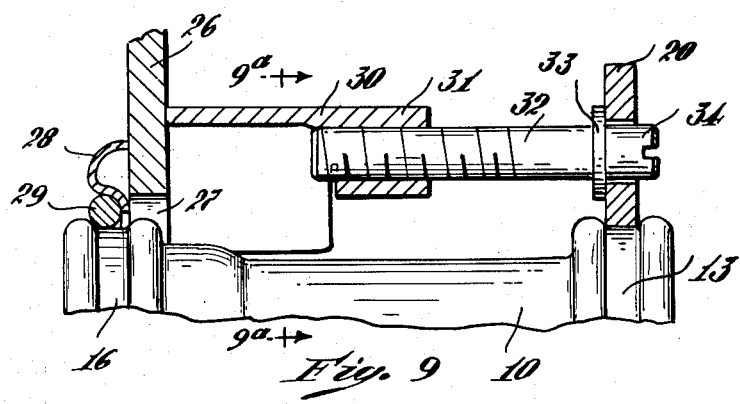
FIG. 9 is a section taken on the line 9—9 of FIG. 8 showing a flange like that of FIG. 4 seated in the rearward groove of the case and showing the means whereby the case is secured within an opening in the panel.
Figure 10:
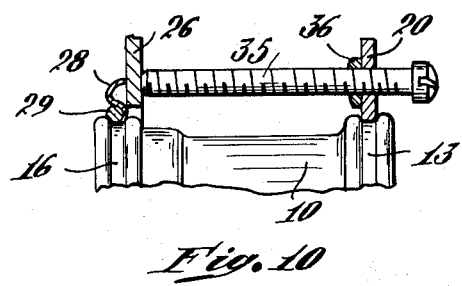
FIG. 10 is a section similar to FIG. 9 but on a smaller scale, showing an alternative clamping means.
Figure 11:
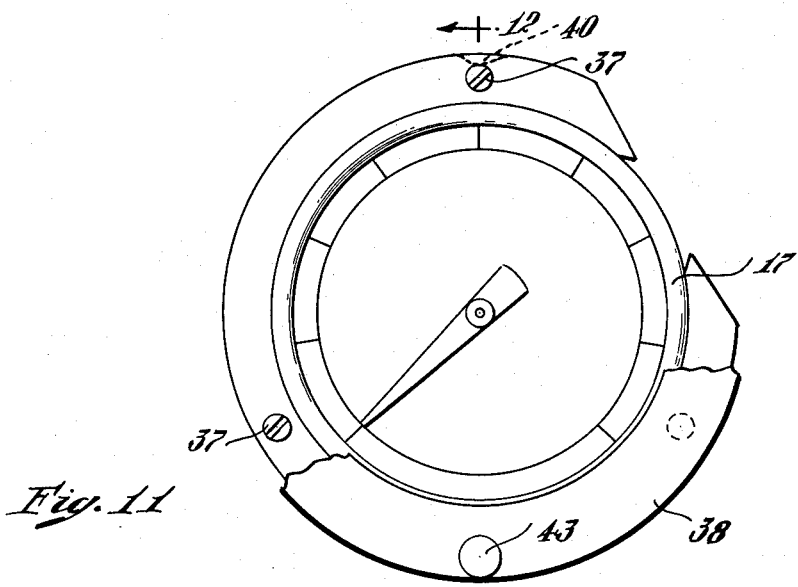
FIG. 11 is a front elevation of a gauge having the case of the present invention mounted in a panel with the flange of FIG. 4 seated in the front groove of the casing and concealed by a removable ring—a portion of the cover ring being broken away.
Figure 12:
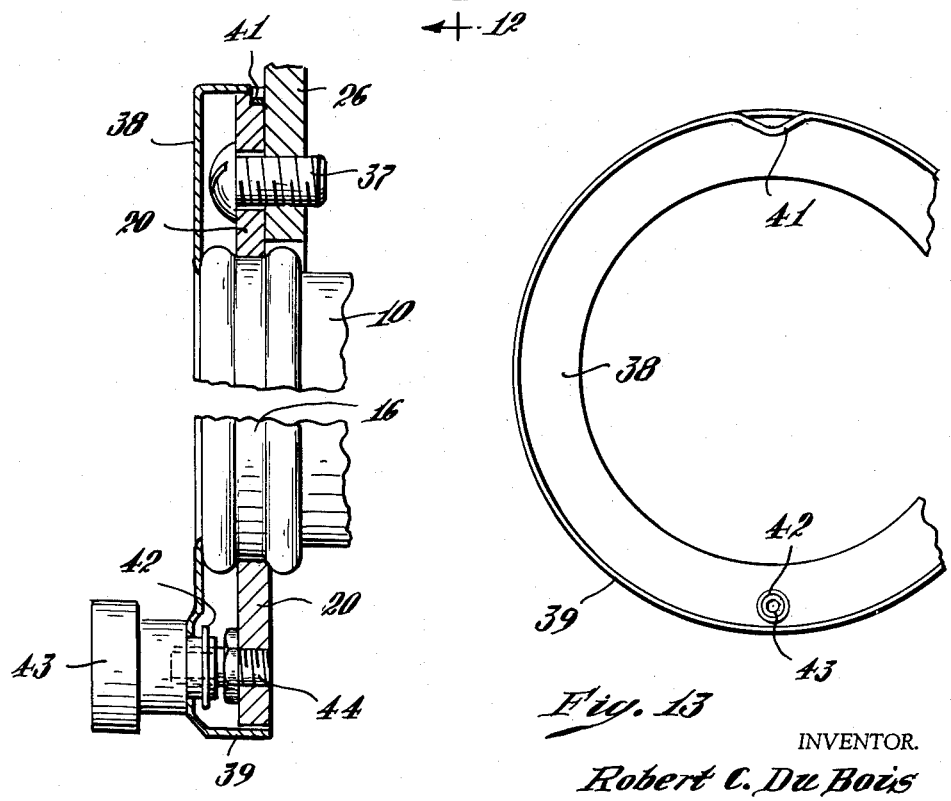
FIG. 12 is a section to enlarged scale taken substantially on the line 12—12 of FIG. 11.
Figure 13:
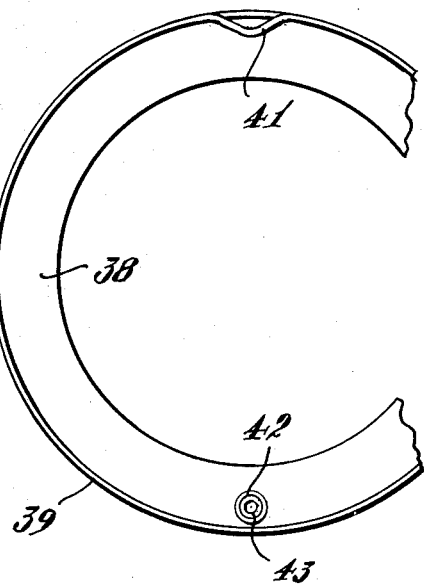
FIG. 13 is a rear elevation of the removable cover ring shown in FIGS. 11 and 12.

If it be desired to mount the gauge substantially flush with the surface of panel 26, instead of upon a wall, the casing 10 of the present invention may be mounted in an aperture in a panel in either of two ways, the first being illustrated in FIGS. 8 to 10 respectively, and the second being illustrated in FIGS. 11 to 13.

Figure 9A:
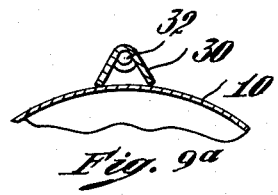
FIG. 9a is a fragmentary section on a reduced scale taken on the line 9a—9a of FIG. 9.

In accordance with the method illustrated in FIGS. 8–10, the flange 20 is snapped into the rearward groove 13 of the casing 10 and the front of the gauge is passed through an aperture 27 in the panel 26. A suitable bezel ring 28, desirably of ornamental appearance, is then slipped over the front of the casing and a snap ring 29 is snapped into the front groove 16 of the casing 10. A V-shaped sheet metal nut 30 (FIGS. 9 and 9a) having a tubular internally threaded end 31 is assembled with a flanged screw 32 and the screw 32 is inserted from the front through a suitable hole in the flange 20, so that the flange 33 of the screw engages the front face of the flange 20 and the head 34 of the screw is exposed at the rear face of the flange 20. At least three screws are provided about the flange circumference 20. In assembling the parts, the edges of the divergent wings of the V-shaped nuts are engaged with the outer surface of the casing thereby preventing the nuts from turning, and as the screws 32 are turned, the front ends of the nuts 30 engage the rear surface of the panel 26, forcing the flange 20 together with the casing 10 rearwardly away from the panel 26 until the snap ring firmly engages the bezel ring 28 and forces the latter against the front surface of the panel 26; thereby firmly clamping the casing 10 to the panel 26. In the clamped position, the concave face of the bezel ring 28 partially embraces the snap ring 29 so that the latter is not thereafter free to be disengaged from the groove 16.

As an alternative to the screw 32 and the nut 30 shown in FIG. 9, an elongate screw 35 (FIG. 10) can be provided whose forward end engages the rear face of the panel 26. A nut 36 on this screw engages the forward face of the flange 20 and forces the flange 20 together with the casing 10 rearwardly of the panel 26 when the screw is turned. The nut 36 could be omitted if the screw holes 22 in the flange 20 were threaded to receive the screw.

By the use of the arrangement shown in FIGS. 11–13, the gauge casing 10 can be secured to a panel 26 even though the rear of the panel be inaccessible. For such use, the flange 20 is snapped into the forward groove 16 of the casing 10 in the position shown in FIG. 11 and the flange is then secured to the front of the panel 26 by means of a plurality of circumferentially spaced screws 37. The front end of the casing and the flange 20 may thereafter be concealed by means of an annular cover plate 38 having an outer generally cylindrical rim 39 which embraces the outer edge of the flange 20. The upper portion of the edge of the flange 20 is provided with an undercut 40 and a corresponding portion of a cover flange 39 has a detent 41 for engagement with the undercut. The cover ring 38 is further provided with a rotatable knob 43 secured to the cover ring by a snap ring 42 and which has an axial, threaded recess (not shown) threading over a stud 44 which is secured in the tapped hole 45 of the flange 20, thereby securing the cover ring to the flange.

FIGS. 14 to 16 illustrate an alternative flange 50 adapted to be clamped by crimping onto either of the grooves 13 or 16 of casing 10. Flange 50, in the uncrimped form shown in FIGS. 14 to 16 and prior to mounting on the casing, comprises an inner arcuate edge portion 51 adapted to seat within the grooves 13 or 16 of casing 10, a radial body portion 52 and an outer circumferential rearwardly rolled flange or rim 53. Flange 50, prior to crimping, is of an interior diameter slightly larger than the maximum diameter of casing 10 so as to be readily inserted thereover. Interior edge portion 51 is provided with a notch 21a to engage a raised dimple (not shown) in the wall of the casing grooves to prevent relative rotation between the flange and the casing. Three holes 22a are provided in the body portion 52 of the flange for the reception of mounting screws, or alternatively, the holes can be replaced with welded studs or fastening elements.

A spacer element 55 is disposed about each hole or stud 22a and comprises sheet material disposed on edge and having a width equal to the depth of the rolled rim 53 so as to prevent collapse of the body portion 52 by the pressure exerted in tightening the fastening means. Each element 55 includes an arm 56 which is welded or otherwise secured to rim 53. A portion of the spacer 55 is bent so as to project parallel to the inner end 51 of the flange to provide tabs 57 which cooperate with inner edge portion 51, to space the flange within groove 13 or 16, which are wider than the thickness of flange edge portion 51, to prevent the axial movement of the flange with respect to the casing.

As illustrated in FIG. 17, an alternative spacer 55a is employed when the flange 50 is to be mounted in the rear groove of the casing and the instrument mounted to a wall. Spacer 55a is of greater width than spacer 55 so as to project substantially beyond the flange rim 53 and provides a spacing between the mounting wall and the instrument which serves as a vent in the event of an instrument explosion.

Flange 50 is provided with a boss 60 adapted to be compressed or crimped to draw the inner diameter of the rim 51 tightly within the casing groove. Boss 60 comprises a body portion 61 having legs 62 and 63 (FIG. 16) which dispose it rearwardly of the body portion 52 of the flange, and a rim portion 64 disposed radially inwardly of rim 53. Inner edge portion 51 is arcuate and terminates in ends r and s located substantially at the edges of boss portion 60 so as to provide a gap for decreasing the interior diameter of the flange.

The flange 50 is secured to the casing 10 by slipping it over the casing in registration with the desired groove 13 or 16, the flange clamped, jaws 65—65 brought into registration with the legs 62 and 63 of boss 60 and the jaws 65—65 forced together to crimp boss 60 and decrease the diameter of the flange, thereby drawing it tightly about the casing 10 within the desired groove. Jaws 65—65 are merely illustrative and are provided with shoulders 66 of sufficient height to clear the rim 53. Other suitable clamping means can be employed to crimp the boss 60, if desired. As shown in FIGS. 19 to 22 the base portion 61 of crimped boss 60 is V-shaped while rim portion 64 is folded into the form of a W.

In FIG. 23 a modification of the casing 10 is shown which can be employed with flange 50. In this modification a narrow circumferential groove 13a is provided of a width just sufficient to accommodate the inner edge 51 of flange 50 without substantial excess. With this modification of the casing, tabs 57 on spacer elements 55 are not required.

Flange 50 is especially adapted for manufacture from relatively thin sheet metal stock so as to reduce the amount of metal required for the flange. This reduction makes it feasible to manufacture the instrument case from stainless steel in accordance with applicant's object of providing an instrument case for universal use.

From the foregoing description it will be apparent that a simple and attractive gauge case is provided which is easy and inexpensive to manufacture and which is universally adaptable for the several modes of use. Where the gauge case is made of stainless steel, the same gauge may suffice for installation in a variety of locations, including those subject to various corrosive atmospheres.

While grooves in the casing wall are herein illustrated as the means receiving the flange, it is obvious that the beads defining these grooves need not be continuous around the circumference of the casing and that other similar means can be employed, such as recesses in the casing wall receiving lugs on the internal circumference of the flange.

It should be understood that the foregoing description is for the purpose of illustration only and that the invention includes all modifications falling within the scope of the appended claims.

I claim:

1. In a dial instrument, a case capable of being mounted upon a wall or panel, said case comprising a substantially tubular casing having two axially spaced peripheral mounting grooves in the external surface thereof, said grooves being located near the front and rear ends respectively of said casing, and a one piece deformable mounting flange having means for mounting the same on a panel and the like, said flange being initially engageable with either of said mounting grooves, said flange including a continuous clamping portion extending substantially in excess of 180 degrees about said casing and engaged in one of said grooves, said flange extending radially of said casing and being deformed so that said portion firmly embraces the casing with a force supplied solely by the deformed flange due to the deformation thereof, and means for mounting said flange on a panel and the like.

2. In a dial instrument, a case comprising a substantially tubular casing of sheet material adapted to be inserted through an opening in a panel and the like, said casing having two pairs of external peripheral beads on the surface thereof, the beads of each pair being spaced to define a peripheral groove therebetween, one groove being near the front and the other near the rear of said casing, a one piece generally flat deformable mounting flange initially engageable with either of said grooves, said flange including a continuous clamping portion at least substantially surrounding said casing in radially extending relation and engaged in one of said grooves, said flange being in a deformed condition with said clamping portion firmly embracing the casing with a force supplied solely by the flange and due to the deformation thereof, and means separate from said flange co-operatingly engageable therewith to secure the flange and thus the casing to a panel or the like.

3. In a gauge of a type having a dial, pointer, conventional pressure responsive element and motion-transmitting mechanism; a case comprising a length of tubing, said length of tubing having a peripheral groove adjacent each end respectively, a mounting flange including a single generally flat arcuate portion of resilient material having an inner diameter which in the free state of said portion is less than the minimum diameter of said grooves, said portion extending about said casing substantially in excess of 180 degrees and being seated in a selected one of said grooves with said portion firmly embracing the casing, said clamping portion further having a single gap whereby it may be expanded within its generally plane, and means whereby said flange may be secured to a support.

4. An instrument case according to claim 1 wherein the inner edge of said flange is seated in the rearward groove and wherein the mounting means for the flange comprises a spacer operative to space the rear end of the case from the wall or panel, whereby the entire instrument will be located forwardly of the wall or panel.

5. In combination with a panel having therein an instrument receiving aperture, an instrument case comprising a substantially tubular casing of sheet material, said casing having a pair of axially spaced circumferential grooves on the peripheral surface thereof, an arcuate, one piece removable flange engaging the rear groove with radial pressure, a snap-ring in said front groove, a bezel ring engaging said snap-ring, said bezel ring bearing against the front of the mounting panel, the casing projecting forwardly through the aperture opening in said panel, and means contacting the back of said panel to force said panel and flange apart thereby firmly clamping said instrument in said panel.

6. A combination according to claim 5, wherein the rear side of the panel is accessible and the means for clamping the instrument to the panel comprises an elongate screw whose axis is parallel to that of the casing, and which is arranged to turn in an opening in the flange.

7. The combination according to claim 5, wherein the rear side of the panel is accessible and the means for clamping the instrument to the panel comprises an elongate screw having its head disposed in an opening in the flange, the screw having a radial shoulder which contacts the forward face of the flange and a nut having threaded engagement with the screw and which contacts the rear surface of the panel.

8. An instrument case according to claim 5 wherein said bezel ring overlies said snap-ring in clamped position so as to prevent removal of the snap-ring.

9. In combination with a panel having an aperture for the reception of an instrument and whose rear surface is inaccessible, an instrument case comprising a substantially tubular casing of sheet material, said casing having a pair of raised circumferential beads on the peripheral surface thereof, said pair of beads defining a groove therebetween, the groove being near the front of said casing, a removable, arcuate flange whose inner edge engages the groove with radial pressure, said flange and casing having aligning means preventing relative rotation, the casing projecting rearwardly from said aperture, but with said groove located immediately forwardly of the front surface, means accessible at the front of the panel for attaching the flange to the latter and a removable cover ring normally concealing said flange.

10. An instrument case capable of being mounted upon a wall or panel, said case comprising a substantially tubular casing having two axially spaced, peripheral mounting means in the external surface thereof, said means being located near the front and rear ends respectively of said casing, a separate flange member engageable, at will, with either of said mounting means, and means cooperating with said flange to secure the instrument to a support, said flange, before mounting thereof to the casing, being of an interior diameter larger than the maximum diameter of said casing and having a boss portion deformable by crimping to reduce said interior diameter to engage one of said peripheral mounting means on the casing.

11. An instrument case according to claim 10 wherein said peripheral mounting means are grooves adapted to receive the inner edge of said flange member.

12. An instrument case according to claim 10, wherein said flange comprises a ring having a radial body portion, an inner circumferential edge adapted to embrace said tubular casing, and a rearwardly projecting outer circumferential rim.

13. An instrument case according to claim 12, wherein a plurality of circumferentially spaced spacer elements are secured to said flange at the rear side thereof, said spacer elements being of a width substantially equal to the depth of said circumferential rim, said elements being disposed adjacent said means to secure the instrument to a support to prevent collapse of the flange.

14. An instrument case according to claim 13, wherein said peripheral mounting means in the external surface of the casing comprises grooves of a width greater than the thickness of said interior edge of the flange, and wherein said spacer elements carry tabs projecting parallel to said interior circumferential edge and so spaced from the latter as a prevent axial movement of the flange with respect to the casing.

15. An instrument casing according to claim 12, wherein said boss portion prior to crimping, comprises a body portion radially disposed of said flange but recessed from the plane of the body portion of the latter, and a rearwardly projecting rim portion disposed radially inwardly of the rim of said flange.

16. An instrument case according to claim 15, wherein said boss, after crimping, comprises a V-shaped body portion and a W-shaped rim portion projecting rearwardly of the front plane of the flange.

References Cited in the file of this patent

UNITED STATES PATENTS

| | | |
|---|---|---|
| 1,474,173 | Scott | Nov. 13, 1923 |
| 1,761,955 | Zubaty | June 3, 1930 |
| 2,219,327 | Miller | Oct. 29, 1940 |
| 2,264,485 | Smith | Dec. 2, 1941 |
| 2,422,908 | Kahn | June 24, 1947 |
| 2,578,608 | Shull | Dec. 11, 1951 |
| 2,790,024 | Fulmer | Apr. 23, 1957 |